US010652898B2

(12) United States Patent
Qvarfordt et al.

(10) Patent No.: US 10,652,898 B2
(45) Date of Patent: May 12, 2020

(54) CONTROL NODE AND METHOD THEREOF

(71) Applicant: Huawei Technologies Co., Ltd., Shenzhen (CN)

(72) Inventors: Johan Christer Qvarfordt, Kista (SE); James Gross, Kista (SE); Hadi Ghauch, Kista (SE); Muhammad Mahboob Ur Rahman, Kista (SE); Sahar Imtiaz, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/194,854

(22) Filed: Nov. 19, 2018

(65) Prior Publication Data

US 2019/0090247 A1 Mar. 21, 2019

Related U.S. Application Data

(63) Continuation of application No. PCT/EP2016/061437, filed on May 20, 2016.

(51) Int. Cl.
*H04W 72/04* (2009.01)
*H04W 28/02* (2009.01)
(Continued)

(52) U.S. Cl.
CPC ....... *H04W 72/0486* (2013.01); *H04W 24/02* (2013.01); *H04W 28/0205* (2013.01);
(Continued)

(58) Field of Classification Search
CPC ............. H04W 72/0486; H04W 24/02; H04W 72/0413; H04W 28/0205; H04W 88/085; H04L 5/0053
See application file for complete search history.

(56) References Cited

U.S. PATENT DOCUMENTS

2012/0327800 A1* 12/2012 Kim ..................... H04W 72/082
370/252
2013/0028182 A1* 1/2013 Geirhofer ............ H04L 5/0051
370/328
(Continued)

FOREIGN PATENT DOCUMENTS

CN   102904625 A   1/2013
CN   105284140 A   1/2016

OTHER PUBLICATIONS

"C-RAN:The Road Towards Green RAN," Mobile, China, pp. 1-48, White Paper, Version 2.5 (Oct. 2011).
(Continued)

*Primary Examiner* — Hoang-Chuong Q Vu
(74) *Attorney, Agent, or Firm* — Leydig, Voit & Mayer, Ltd.

(57) ABSTRACT

The disclosure relates to a control node. The first control node comprises a transceiver configured to receive a first set of Channel State Information, CSI, comprising CSI for radio channels between a plurality of first remote radio heads and a plurality of user devices, a processor configured to determine a first association based on the first set of CSI, wherein the first association comprises an association between the plurality of first remote radio heads and the first control node. Furthermore, the disclosure also relates to a corresponding method, a cellular wireless communication system, and a non-transitory computer readable medium.

19 Claims, 5 Drawing Sheets

(51) Int. Cl.
*H04W 24/02* (2009.01)
*H04W 88/08* (2009.01)
*H04L 5/00* (2006.01)

(52) U.S. Cl.
CPC ....... *H04W 72/0413* (2013.01); *H04L 5/0053* (2013.01); *H04W 88/085* (2013.01)

(56) References Cited

U.S. PATENT DOCUMENTS

| | | | |
|---|---|---|---|
| 2013/0029655 A1 | 1/2013 | Gao | |
| 2013/0155973 A1* | 6/2013 | Geirhofer | H04W 72/1231 370/329 |
| 2013/0231125 A1* | 9/2013 | Jeon | H04W 72/082 455/452.1 |
| 2013/0242748 A1 | 9/2013 | Mangalvedhe et al. | |
| 2013/0265981 A1* | 10/2013 | Yang | H04L 5/003 370/329 |
| 2013/0322273 A1* | 12/2013 | Etemad | H04W 24/10 370/252 |
| 2014/0031049 A1 | 1/2014 | Sundaresan et al. | |
| 2014/0094169 A1* | 4/2014 | Takano | H04W 48/16 455/434 |
| 2014/0211734 A1* | 7/2014 | Seo | H04J 11/0056 370/329 |
| 2014/0212129 A1* | 7/2014 | Huang | H04W 48/20 398/2 |
| 2015/0036664 A1* | 2/2015 | Yuk | H04W 36/30 370/332 |
| 2015/0256971 A1 | 9/2015 | Arvidsson | |
| 2015/0341814 A1* | 11/2015 | Yu | H04B 7/04 370/252 |
| 2016/0037511 A1* | 2/2016 | Vincze | H04B 7/024 370/329 |
| 2017/0187441 A1* | 6/2017 | Manolakos | H04B 7/0626 |
| 2017/0251380 A1* | 8/2017 | Schabel | H04W 16/14 |
| 2019/0074876 A1* | 3/2019 | Kakishima | H04L 5/0007 |

OTHER PUBLICATIONS

Zhao et al., "Cluster Formation in Cloud-Radio Access Networks: Performance Analysis and Algorithms Design" 2015 IEEE International Conference on Communications (ICC), pp. 3903-3908, Institute of Electrical and Electronics Engineers—New York, New York (Jun. 2015).

Binbin, "Sparse Beamforming and User-Centric Clustering for Downlink Cloud Radio Access Network." Access, IEEE 2 (2014) pp. 1326-1339, Institute of Electrical and Electronics Engineers—New York, New York (Nov. 11, 2014).

Mahboob et al., "RRH clustering and transmit precoding for interference-limited 5G CRAN downlink" 2015 IEEE Globecom Workshops (GC Wkshps), pp. 1-7, Institute of Electrical and Electronics Engineers—New York, New York (2015).

Simeone et al., "Cloud Radio Access Network: Virtualizing Wireless Access for Dense Heterogeneous Systems," vol. 18, No. 2, pp. 135-149, Journal of Communications and Networks (Apr. 2016).

Jose et al., "Pilot Contamination and Precoding in Multi-Cell TDD Systems," Transactions on Wireless Communications, vol. 10, No. 8, pp. 2640-2651, Institute of Electrical and Electronics Engineers—New York, New York (Aug. 2011).

Ngo et al., "The Multicell Multiuser MIMO Uplink with Very Large Antenna Arrays and a Finite-Dimensional Channel," IEEE Transactions on Communications, vol. 61, No. 6., pp. 2350-2361, Institute of Electrical and Electronics Engineers—New York, New York (Jun. 2013).

Ghauch et al., "Coordination and Antenna Domain Formation in Cloud-RAN systems," IEEE ICC 2016—Signal Processing for Communications Symposium, pp. 1-7, Institute of Electrical and Electronics Engineers—New York, New York (2016).

* cited by examiner

CONTROL NODE AND METHOD THEREOF

CROSS-REFERENCE TO RELATED APPLICATIONS

This application is a continuation of International Application No. PCT/EP2016/061437, filed on May 20, 2016, the disclosure of which is hereby incorporated by reference in its entirety.

TECHNICAL FIELD

The disclosure relates to a control node. Furthermore, the disclosure also relates to a corresponding method, a wireless communication system, and a non-transitory computer readable medium.

BACKGROUND

Traditionally cellular networks have employed a fixed structure of infrastructure antennas to support user data requests. The most prominent element in this structure has been the base station, which utilizes a set of radio resources in a certain spatial area, leading to the deployment of many base stations over a bigger area to achieve coverage, e.g. in a city. In this given structure, user terminals are typically associated with one base station, which serves the user as long as the user is in its coverage range. If the user moves out of the coverage range, then typically a handover is performed such that the user experience can be preserved by the network. A handover typically involves the association of the user with a new base station leading to a redirection of backlogged and newly arriving data in the backbone to the new base station.

In these state-of-the-art systems, in addition to handover phenomena described above, two additional scenarios are known that alter the user-base station association. Load imbalance: If significantly more users are associated locally to one base station in comparison to the neighbouring ones, then load balancing might be invoked which consists of handing over selected user terminals from the overloaded cell. Several reasons can lead to such load balancing action, such as overload of the backhaul, clogging of the random access channel, or insufficient radio resources on the air interface to serve all users. Cell-edge users: When a user terminal is at the border of one cell, the user terminal is likely to experience a very low Signal to Interference and Noise Ratio (SINR). Then, one solution proposed in the literature and implemented in Long Term Evolution (LTE) advanced is to have the user terminal associate to two base stations simultaneously. This is referred to as coordinated multi-point transmission, which requires tight synchronization of the involved base stations, as they transmit data symbols on the same radio resources at the same time points to the receiving user terminal. In this case, the user data is forwarded to two base stations simultaneously. Coordinated multi-point furthermore has the advantage to potentially reduce interference between neighbouring base stations.

More recently, with the beginning of discussions on 5G specifications and their technological enablers, novel cellular architectures are emerging. Among those architectures is the Cloud Radio Access Network (CRAN), a centralized cloud-computing solution proposed for future 5G cellular networks. By employing a large number of transmit antennas in a dense setting, CRAN is able to achieve extremely high data rates/area spectral efficiency requirements specified by the 5G. More specifically, there exists the idea to deploy large sets of so called Remote Radio Heads (RRHs), essentially antenna arrays deployed locally with low processing capabilities, which are controlled in terms of their transmission characteristics by a more centralized entity referred to as Aggregation Node (AN). The AN coordinates the transmission of multiple RRHs and therefore requires the RRHs to be assigned to the AN, building a so called Antenna Domain (AD). In this architecture, user terminals are associated to some RRH, and through the RRH to some AN. This novel architecture has significant advantages when it comes to serving the associated terminals as the transmission of the multiple RRHs can be coordinated leading (among other issues) to a fine-grained control of the interference.

In a conventional solution one single antenna domain is considered and assumes that grand coalition (i.e., cooperative transmission by all the RRHs in the considered AD) is not possible due to limited backhaul and lack of global Channel State Information at the Transmitter (CSIT) at the AN. This conventional solution then investigates the gains in sum rate and energy efficiency due to RRH clustering (when instead of a grand coalition, local coalitions are formed by the RRHs). Authors assume that transmission strategy within each RRH cluster is fixed to Block Diagonal/Zero-Forcing Beamforming (BD/ZFBF). Then, for each RRH cluster, authors compute successful access (i.e., coverage) probability for each user (given some pre-specified threshold SINR) using stochastic geometry concepts; this coverage probability is then multiplied with the deterministic/pre-specified rate to compute the sum rate per cluster. This sum rate is then used to construct a utility function to set up a coalitional formation game to solve RRH clustering problem; the coalitional formation game is then solved using merge and split method. The proposed scheme performs in between grand-coalition and no-coalition schemes (the two extreme cases), as expected.

In another conventional solution a single antenna domain is considered where each RRH is connected to the AN via a constrained backhaul link. Moreover, the backhaul links of different RRHs are assumed to have different capacities. The per-RRH backhaul constraint into an equivalent per-RRH transmit power constraint is then re-formulated. They then solve the problem of weighted sum rate maximization by doing static/dynamic user-centric clustering of RRHs (i.e., multiple RRHs jointly serving a user, similar to CoMP) while RRHs within one cluster employ Weighted Minimum Mean Square Error (WMMSE) precoding scheme. The authors also propose some heuristic, sub-optimal methods for RRH clustering. The simulation results show a performance gain of proposed methods compared to naive RRH clustering methods available in the literature.

Several major shortcomings arise from the conventional solutions in the context of the CRAN architecture.

Interference between ADs: While conventional solutions has been investigating techniques to balance interference between several clusters within an AD, it is open how to deal with interference between neighbouring ADs, except for resorting to traditional RRM based interference mitigation techniques.

Backhaul limitations of the ANs: It is furthermore completely open how to deal with capacity constraints on the backhaul of each AD, or also with capacity constraints regarding the backhaul between RRHs and an AN.

Radio resource limitations on the air interface between RRHs and user terminals/limitations on the control channel/ limitations on the random access channel: It is open in CRAN how to deal with strongly varying user distribution over a certain area of interest with multiple ANs and many RRHs, i.e. how to perform load balancing in CRAN, except for resorting to traditional load balancing techniques.

Processing limitations of the RRHs or the AN: It is open how to deal with limitations with respect to the processing capabilities of either RRHs (if they are equipped with such resources), and/or how to deal with processing limitations at the ANs.

SUMMARY

Some embodiments of the disclosure provide a solution which mitigates or solves the drawbacks and problems of various conventional solutions.

Some embodiments of the disclosure provide mechanisms that allow the formation and re-formation of antenna domains in a wireless communication system.

The above and further objectives are achieved by the subject matter of some embodiments.

According to a first aspect of the disclosure, the above mentioned and other objectives are achieved with a first control node for a wireless communication system, the first control node comprising
a transceiver configured to
receive a first set of Channel State Information, CSI, comprising CSI for radio channels between a plurality of first remote radio heads and a plurality of user devices a processor configured to
determine a first association based on the first set of CSI, wherein the first association comprises an association between the plurality of first remote radio heads and the first control node.

The meaning of the expression "association" in this context may mean the logical assignment of RRH(s) to a control node. This may e.g. relate to the management of user device(s) which in turn are associated to its RRH. Therefore, the management of user devices maybe performed by the control node via the RRH it is associated to.

The first control node according to the first aspect provides a number of advantages over conventional solutions.

One such advantage is interference minimization for a given user association and hence for a given channel condition, solving the Antenna Domain Formation (ADF) problem to minimize the interference leakage within the Area of Interest (AoI).

Another advantage is efficient utilization of network resources by taking into account the per-control node/per-RRH processing constraints to solve the ADF problem and accordingly redistributing the load across different antenna domains. This will also result in a more robust network which can handle abrupt fluctuations in user load more elegantly. Moreover, both of above effects will ultimately lead to a substantial increase in system throughput, user fairness, better performance, increase in network capacity, energy efficiency, etc.

Better performance, i.e. higher throughput, higher reliability, lower latency, etc., per user terminal due to reduced interference between different ADs and/or lower congestion on the backhaul links, and/or lower computational load per control node, and/or lower number of user terminals assigned per RRH, etc. is achieved with the first control node according to the first aspect.

Increase of the overall's network capacity (in terms of satisfied users) by better management of the interference between ADs, more balanced distribution of the load between ADs, more balanced backhaul utilization and lower computational load per control node are other effects. These system effects also increase the network robustness in terms of its ability to react in line with existing service level agreements to a significant (sudden) increase of network load.

Also, energy efficiency by reduced power consumption of the network due to lower transmit power spent on the air interface due to better interference management as well as a dynamic activation and deactivation of RRHs and/or control nodes.

In a first possible implementation form of a control node according to the first aspect, the processor is configured to determine the first association by
compute at least one cross coupling between the plurality of first remote radio heads and a plurality of user devices based on the first set of CSI,
determine the first association based on the computed cross coupling. An advantage with this implementation form is that the cross coupling is a suitable measure on which the first association may be computed for improved performance.

In a second possible implementation form of a control node according to the first implementation form of the first aspect, the processor is configured to determine the first association by
compute a first cross coupling between the plurality of first remote radio heads and a plurality of user devices for a first candidate association,
compute at least one second cross coupling between the plurality of first remote radio heads and a plurality of user devices for a second candidate association,
determine the first association by selecting the first candidate association or the second candidate association having the lowest cross coupling.

An advantage with this implementation form is that by comparing different candidates even better performance is possible.

In a third possible implementation form of a control node according to the second implementation form of the first aspect, the processor is configured to determine the first association iteratively by
compute the first cross coupling in an iteration,
compute the second cross coupling in a subsequent iteration,
determine the first association in the subsequent iteration.

The iterations may be stop when a criterion is fulfilled. For example, expected performance such as: system bitrate for the plurality of user devices, a bitrate fairness between the plurality of user devices, or a bitrate percentile of the plurality of user devices.

An advantage with this implementation form even better performance is possible by iterating towards a solution.

In a fourth possible implementation form of a control node according to any of the preceding implementation forms of the first aspect, the transceiver is configured to
receive a second set of CSI from a second control node, wherein the second set of CSI comprises CSI for radio channels between a plurality of second remote radio heads and the plurality of user devices,
wherein the processor is configured to
determine the first association based on a concatenation of the first set of CSI and the second set of CSI.

The first set of CSI and the second set of CSI are orthogonal to each other since they come from different RRHs. Therefore, the concatenation of the first set of CSI and the second set of CSI.

An advantage with this implementation form is that by having more than one control node interacting and cooperating with each other even better system performance is possible. For example, id the distance between the RRH and the control node can be kept small, the coordination area can enable low delay coordination between RRHs for better performance, while still benefit from the present ADF algorithm.

In a fifth possible implementation form of a control node according to the fourth implementation form of the first aspect, the transceiver is configured to transmit the first association to the second control node.

An advantage with this implementation form is that relevant information exchange is made possible between different control nodes in the system for even better system performance.

In a sixth possible implementation form of a control node according to the fourth or fifth implementation forms of the first aspect, the transceiver is configured to transmit the first set of CSI to the second control node.

An advantage with this implementation form is that by further sharing CSI information will make the present ADF even more powerful yielding higher performance.

In a seventh possible implementation form of a control node according to the fourth, fifth or sixth implementation forms of the first aspect, the processor is configured to determine a first trigger comprising an instruction for the second control node to determine a second association between the plurality of second remote radio heads and the second control node, wherein the transceiver is configured to transmit the first trigger to the second control node.

The first trigger may be determined based on at least one of: computational load of the first control node, and a capacity utilization of a backhaul link between the first control node and at least one of the plurality of first remote radio heads.

An advantage with this implementation form by adding trigger to start the present ADF algorithm is that it can reduce the signaling overhead between the control nodes, such that the present ADF algorithm is only invoked when needed. This could be compared to having it running all the time.

In an eight possible implementation form of a control node according to the fourth, fifth, sixth or eight implementation forms of the first aspect, the transceiver is configured to receive a second trigger from the second control node, the second trigger comprising an instruction for the first control node to determine the first association, wherein the processor is configured to determine the first association in response to the reception of the second trigger.

In a ninth possible implementation form of a control node according to any of the preceding implementation forms of the first aspect, the transceiver is configured to transmit the first association to the plurality of first remote radio heads.

An advantage with this implementation form is that to make sure the RRHs gets the updated information and can execute the re-association to the indicated control node.

In a tenth possible implementation form of a control node according to any of the preceding implementation forms of the first aspect, the association between the plurality of first remote radio heads and the first control node comprises assignment of the plurality of first remote radio heads to the first control node.

In an eleventh possible implementation form of a control node according to any of the preceding implementation forms of the first aspect, the first association further comprises a connection between the plurality of first remote radio heads and the plurality of user devices.

An advantage with this implementation form is that by the addition of the connection between control node, RRHs and user devices the first association is an increased degree of freedom for the present ADF algorithm to further enhance the performance of the system.

According to a second aspect of the disclosure, the above mentioned and other objectives are achieved with a method for a wireless communication system, the method comprising:

receiving a first set of CSI comprising CSI for radio channels between a plurality of first remote radio heads and a plurality of user devices, determining a first association based on the first set of CSI, wherein the first association comprises an association between the plurality of first remote radio heads and the first control node.

In a first possible implementation form of a method according to the second aspect, the method comprises computing at least one cross coupling between the plurality of first remote radio heads and a plurality of user devices based on the first set of CSI, determining the first association based on the computed cross coupling.

In a second possible implementation form of a method according to the first implementation form of the second aspect, the method comprises computing a first cross coupling between the plurality of first remote radio heads and a plurality of user devices for a first candidate association, computing at least one second cross coupling between the plurality of first remote radio heads and a plurality of user devices for a second candidate association, determining the first association by selecting the first candidate association or the second candidate association having the lowest cross coupling.

In a third possible implementation form of a method according to the second implementation form of the second aspect, the method comprises computing the first cross coupling in an iteration, computing the second cross coupling in a subsequent iteration, determining the first association in the subsequent iteration.

The iterations may be stop when a criterion is fulfilled. For example, expected performance such as: system bitrate for the plurality of user devices, a bitrate fairness between the plurality of user devices, or a bitrate percentile of the plurality of user devices.

In a fourth possible implementation form of a method according to any of the preceding implementation forms of the second aspect, the method comprises receiving a second set of CSI from a second control node, wherein the second set of CSI comprises CSI for radio channels between a plurality of second remote radio heads and the plurality of user devices, determining the first association based on a concatenation of the first set of CSI and the second set of CSI.

The first set of CSI and the second set of CSI are orthogonal to each other since they come from different RRHs. Therefore, the concatenation of the first set of CSI and the second set of CSI.

In a fifth possible implementation form of a method according to the fourth implementation form of the second aspect, the method comprises transmitting the first association to the second control node.

In a sixth possible implementation form of a method according to the fourth or fifth implementation forms of the second aspect, the method comprises transmitting the first set of CSI to the second control node.

In a seventh possible implementation form of a method according to the fourth, fifth or sixth implementation forms of the second aspect, the method comprises determining a first trigger comprising an instruction for the second control node to determine a second association between the plurality of second remote radio heads and the second control node, transmitting the first trigger to the second control node.

In an eight possible implementation form of a method according to the fourth, fifth, sixth or eight implementation forms of the second aspect, the method comprises receiving a second trigger from the second control node, the second trigger comprising an instruction for the first control node to determine the first association, determining the first association in response to the reception of the second trigger.

In a ninth possible implementation form of a method according to any of the preceding implementation forms of the second aspect, the method comprises transmitting the first association to the plurality of first remote radio heads.

In a tenth possible implementation form of a method according to any of the preceding implementation forms of the second aspect, the association between the plurality of first remote radio heads and the first control node comprises assignment of the plurality of first remote radio heads to the first control node.

In an eleventh possible implementation form of a method according to any of the preceding implementation forms of the second aspect, the first association further comprises a connection between the plurality of first remote radio heads and the plurality of user devices.

The advantages of the method according to the second aspect are the same as for the corresponding first control node according to the first aspect.

Embodiments of the disclosure also relates to a computer program, characterized in code means, which when run by processing means causes said processing means to execute any method according to the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of embodiments of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

Figure 1:
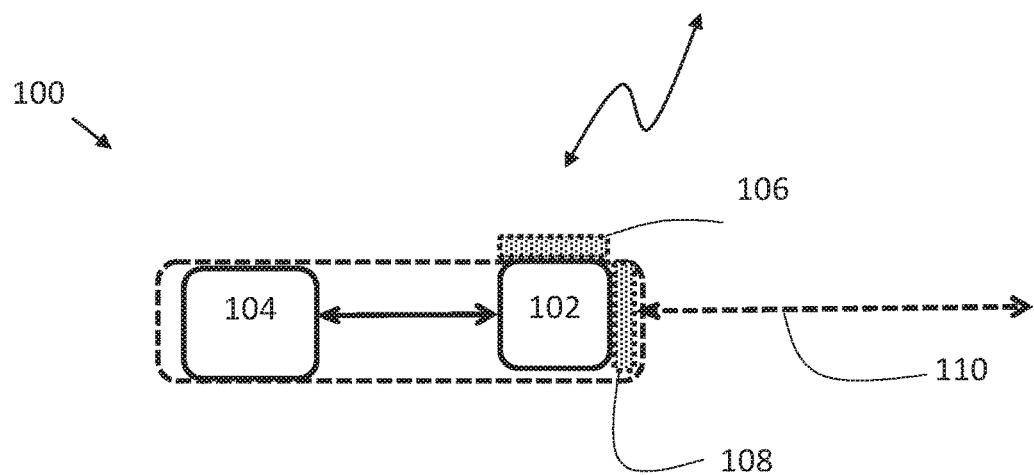
FIG. 1 shows a control node according to an embodiment of the disclosure.

FIG. 1 shows a control node 100 according to an embodiment of the disclosure. The control node 100 comprises a transceiver 102 communicably coupled with a processor 104. The transceiver may further be coupled with an antenna 106 for wireless communication and/or a modem 108 for wired communication over a wired line 110. The transceiver 102 is configured to receive a first set of Channel State Information (CSI) comprising CSI for radio channels between a plurality of first remote radio heads 410a, 410b, . . . , 410n and a plurality of user devices 500a, 500b, . . . , 500n (see FIG. 3). The processor 104 is configured to determine a first association 110 based on the first set of CSI, wherein the first association 110 comprises an association between the plurality of first remote radio heads 410a, 410b, . . . , 410n and the first control node 100.

The control node 100 can be a centralized server hosting baseband functionality for a number of Remote Radio Heads (RRH) or equivalently Transmission and Reception Points (TRPs). The control node 100 can further be an RRM server controlling the base stations that shall coordinate their transmissions/receptions. To use 3GPP terminology in 5G some companies suggest have a Central Unit (CU) and many Distributed Units (DU). In LTE there have been discussions about a coordinated RRM (cRRM) server or a master eNB (MeNB) for dual connectivity. Both these nodes could be a control node 100. Further, the control node 100 could be an Access and Mobility Control (AMC) node. The control node 100 would be similar to an SRNC in UMTS, although UMTS did not support such tight CoMP as described herein.

Figure 2:
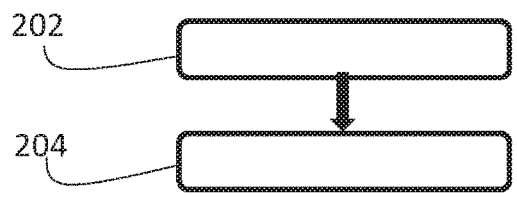
FIG. 2 shows a corresponding method according to an embodiment of the disclosure.

FIG. 2 shows a corresponding method which may be executed in a control node, such as the one shown in FIG. 1. The method 200 comprises receiving 202 a first set of CSI comprising CSI for radio channels between a plurality of first remote radio heads 410a, 410b, . . . , 410n and a plurality of user devices 500a, 500b, . . . , 500n. The method 200 further comprises determining 204 a first association 110 based on the first set of CSI. The first association 110 comprises an association between the plurality of first remote radio heads 410a, 410b, . . . , 410n and the first control node 100.

Figure 3:
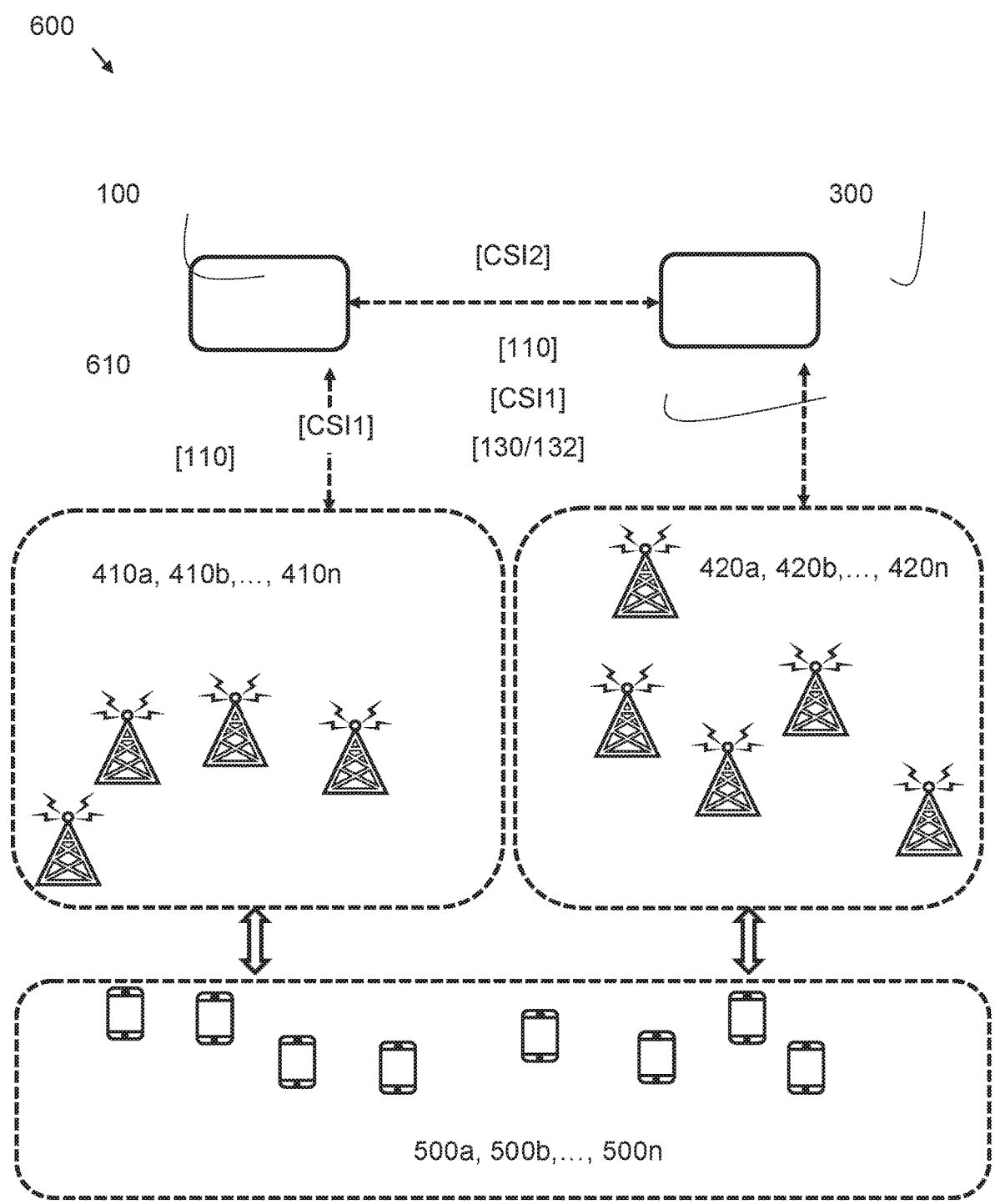
FIG. 3 illustrates a wireless communication system according to an embodiment of the disclosure.

FIG. 3 illustrates an exemplary embodiment of the disclosure in a cellular wireless communication system 600. Is its illustrated how the first control node 100 receive a first set of CSI from first remote radio heads 410a, 410b, . . . , 410n over communication link 610. After having determined the first association 110 the first control node 100 transmits the first association 110 to the remote radio heads 410a, 410b, . . . , 410n.

FIG. 3 further illustrates the cooperation and interaction between control nodes of the system. Only two control nodes are shown in FIG. 3 but it is realized that the present solution is not limited thereof. The second control node 300 transmits a second set of CSI to the first control node 100. The second set of CSI comprises CSI for radio channels between a plurality of second remote radio heads 420a, 420b, . . . , 420n and the plurality of user devices 500a, 500b, . . . , 500n. Hence, the first control node 100 is configured to determine the first association 110 based on a concatenation of the first set of CSI and the second set of CSI for even better system performance.

FIG. 3 also illustrates further signaling between the control nodes of the system for yielding even better performance due to cooperative aspects of embodiments of the disclosure.

The first control node 100 transmits the first association 110 to the second control node 300. The first control node 100 transmits the first set of CSI to the second control node (300).

The first control node 100 determines a first trigger 130 comprising an instruction for the second control node 300 to determine a second association 112 between the plurality of second remote radio heads 420a, 420b, . . . , 420n and the second control node 300. Further, the first control node 100 transmits the first trigger 130 to the second control node 300. Accordingly, the first control node 100 receives a second trigger 132 from the second control node 300. The second trigger 132 comprising an instruction for the first control node 100 to determine the first association 110. Upon reception of the second trigger 132 the first control node 100 determines the first association (110) in response to the reception of the second trigger (132).

As aforementioned, in conventional solutions each Control Node (CN) or equivalently Aggregation Node (AN) is limited in the number of RRHs and user terminals that might be associated to it due to several reasons such as the backhaul capacity and processing capacity of the multiple ADs. As RRHs can potentially establish backhaul connections to more than one AN, different compositions of ADs are possible which leads to the so-called antenna domain formation (ADF) problem, namely which AD formation to choose.

A concern that triggered the present solution is the need to mitigate the interference between different ADs through a suitable solution to the ADF problem, as the transmissions across ADs are not coordinated. Specifically, this is called "interference leakage minimization" problem where the objective is to minimize pairwise interference leakage between all the RRHs in the Area of Interest (AoI). To this end, we first notice that the interference leakage minimization problem can be re-formulated as ADF problem. Then, given an initial system state, the pairwise interference leakage between all the RRHs in the AoI (or, global CSI of the whole AoI) is acquired by all the ANs. Based upon the collected measurements, the ANs compute the new (potentially better) formations of ADs which are then implemented by the system.

At this point, it is worth mentioning that the present solution is not limited in application to CRAN architecture only. It is rather applicable to any "suitable" cellular architecture, where a suitable architecture is defined as a layered architecture with three layers of communication nodes, i.e., user devices, transmit antennas (such as RRHs), and control nodes. Having said this, CRAN is one such suitable architecture where the transmit antennas are called RRHs, and control nodes are called ANs.

With reference to FIGS. 1, 2 and 3 the present solution proposes a novel control node and corresponding method to optimize system-level performance in a cellular architecture, where a suitable architecture is defined as a layered architecture with three layers of nodes. Having said this, in the following disclosure the proposed solution is described and explained in the context of CRAN which is one such suitable architecture where the transmit antennas are called RRHs, and CNs are called ANs. The present solution is however no limited thereof.

Figure 4:
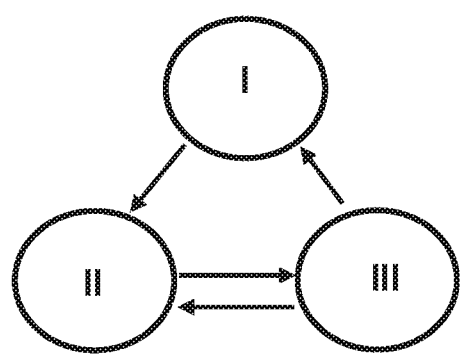
FIG. 4 illustrates a state machine of an embodiment of the disclosure.

When the proposed solution is in force, the cellular architecture will be in one of the three states as shown in FIG. 4.

In the stable state I: The cellular system has the desired system-level throughput, and is therefore in stable state.

In the ADF state II: The cellular system transitions to this state due to some external trigger (e.g. user movement), or, internal trigger (e.g. backhaul constraints). Then, the ADF state consists of three sequential mechanisms as illustrated in FIG. 5 where each mechanism outlines the characteristics of control data flow between network elements, i.e., ANs, RRHs, and user devices.

In the user re-association state III: The cellular system transitions to this state when the ADF state has reached a stable solution based on the current user device-RRH assignment. In this state the user device-RRH assignment can be revisited based on the same criterion as for the ADF state to further increase the performance. With the new user device-RRH assignment the system can transition back to the ADF state to see if there is an even better solution, or it can transition to the stable operation state if there is no better solution to be found, or the system performance increase is lower than a threshold.

Having said this, the ADF state consists of three essential mechanisms, as already pointed out above. To utilize the present solution, these three mechanisms must be executed in sequential order by the network. In the following, we first describe each mechanism in an abstract form (and in CRAN context), and illustrate each step then with respect to "interference leakage minimization" by ADF. Note that this is only an example to better explain the mechanism steps. Additionally, we assume that some initial RRHs-to-AN associations as well as user device-to-RRH-associations are given.

Figure 5:
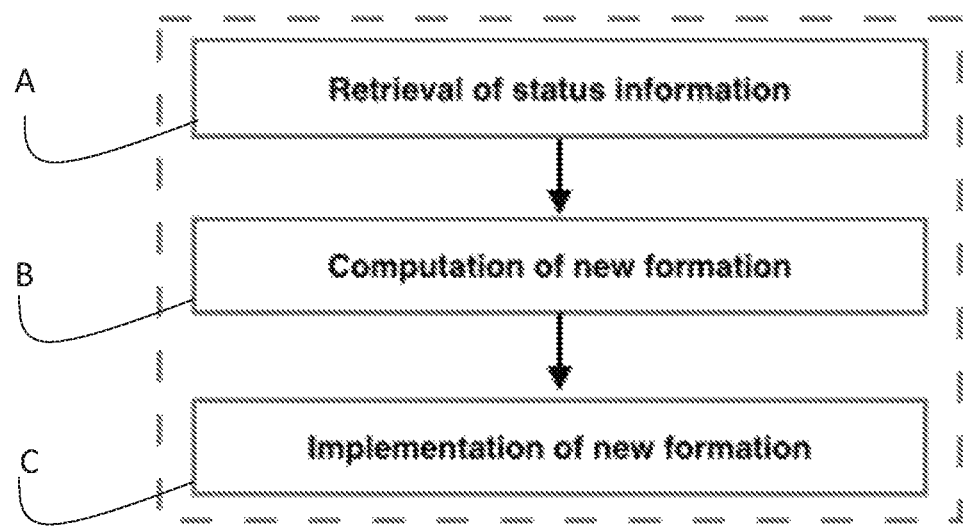
FIG. 5 illustrates a general flow chart for in a wireless communication system.

With reference to FIG. 5 we will elaborate each of the three mechanisms A, B and C more (i.e., which network elements are involved, and what kind of control signalling is done) with the example of Interference leakage minimization problem. As mentioned, in this context an AN fully corresponds the present control device 100 and the expression "user" is fully interchangeably used with the present "user device" and the LTE term UE.

A) Retrieval of Status Information

This mechanism is also known as measurement collection & dissemination phase. For the interference leakage minimization problem, the pairwise interference leakage impact between neighbouring RRHs/users is to be computed by all the ANs (when RRHs/users are assigned to different ADs). To this end, each of the AN in the AoI (either jointly with other ANs, or, independently) assigns orthogonal/non-orthogonal (w.r.t. other ANs) radio/coding resources to its associated users for piloting on the uplink. The users then transmit pilots on the uplink which help each AN gather the Channel State Information at the Transmitter (CSIT) of/all the users in the AoI (through its associated RRHs). Next, control and data signalling (over AN-AN backhaul) is utilized by the ANs to exchange the CSIT data between the ANs. Then, in the end, either one AN has the global CSIT (for the whole AoI) (centralized computation of new formation), or, multiple ANs have the global CSIT (distributed computation of new formation).

Figure 6:
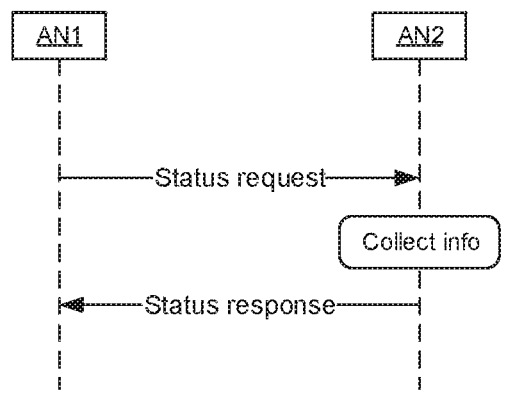
FIG. 6 shows the retrieval of status information in a wireless communication system.

On the control plane of the CRAN, a primitive (a well-defined communication procedure which may be invoked by a higher layer and executed by a lower layer) is required to query status information either regarding an AN, and/or an AN and its associated RRHs, and/or an AN, its associated RRHs, and its associated user terminals. The primitive allows to specify the type of information of interest, for instance the (average or instantaneous) computational load of the AN, the (average or instantaneous) load of the backhaul of the AN or of the associated RRHs, the number of associated user terminals to an AN, the number of associated terminals to a RRH, the (average or instantaneous) channel state between an associated user terminal and some specified RRH, an aggregate of the channel state information of a set of terminals and a specified RRH, as well as information regarding the position of user terminals associated to an AN. This information needs to be collected/monitored by the AN upfront, or upon the reception of the primitive this information is collected and afterwards provided to the requesting entity that sent the primitive. This is exemplified FIG. 6 in which AN1 transmits a Status request to a AN2. In response to reception of the Status Request AN2 collects information and transmits a Status report comprising the collected information to AN1.

Example in the Context of Interference Leakage Minimization

In order to perform ADF to minimize interference leakage, it is mainly required to obtain global channel state information (CSI) of all channels between transmitters/receivers of the whole AoI (either more frequently/instantaneous CSI case, or, less frequently/statistical CSI case). One possibility to implement this is to carry out CSI acquisition per RRH during the uplink transmission phase of the air-interface (assuming a TDD air-interface). For this, either traditional/orthogonal piloting methods, or, WMMSE method could be used. This way, each AN gets (from RRHs connected to it) the CSI vector for the channels between its RRHs and all the users in the AoI. This information is then either directly provided in case the primitive is executed, or it is further aggregated to represent statistical characterization of the links. In a third variant, each AN could track the positions of the associated user terminals and report the positions back in case the primitive is executed by an external entity.

B) Computation of New Formation

In this mechanism, either based on a central approach or based on a decentralized approach, the global CSIT data gathered by AN(s) is processed to yield improved RRH-to-AN associations (as well as improved user-to-RRH associations). The decentralized approach can consist of an iterative process (e.g., by using the BCD method) where—in a predetermined sequence—intermediate solutions are computed and passed on to other ANs on AN-AN backhaul through a separate signalling protocol. This sequence might be terminated after a predefined quality threshold is reached to reduce the signalling on the AN-AN backhaul, and this is typically done when the metric that is optimized does not change significantly any more, or alternatively when a certain absolute value is reached.

In one embodiment the first association 110 is determined by compute at least one cross coupling between the plurality of first remote radio heads 410a, 410b, . . . , 410n and a plurality of user devices 500a, 500b, . . . , 500n based on the first set of CSI, and determine the first association 110 based on the computed cross coupling.

In one example, the first control node 100 computes a first cross coupling between the plurality of first remote radio heads 410a, 410b, . . . , 410n and a plurality of user devices 500a, 500b, . . . , 500n for a first candidate association. Further, computes at least one second cross coupling between the plurality of first remote radio heads 410a, 410b, . . . , 410n and a plurality of user devices 500a, 500b, . . . , 500n for a second candidate association. Finally, determines the first association 110 by selecting the first candidate association or the second candidate association having the lowest cross coupling.

In the iterative approach the first control node 100 determines the first association 110 by iteratively:
compute the first cross coupling in an iteration,
compute the second cross coupling in a subsequent iteration,
determine the first association 110 in the subsequent iteration.

Figure 8:
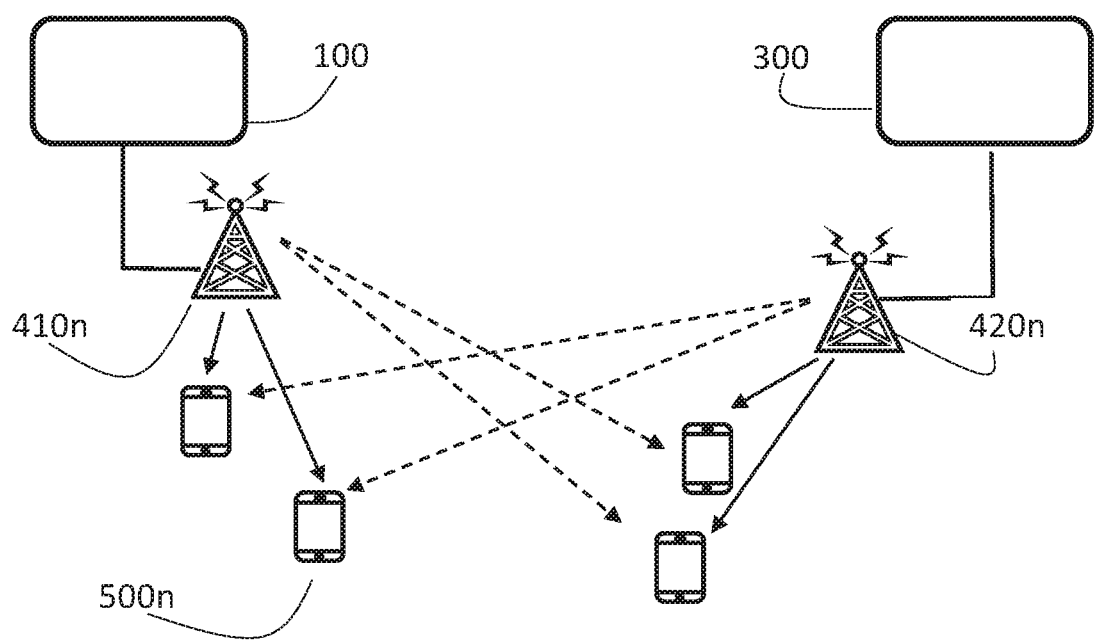
FIG. 8 illustrates cross-coupling.

The meaning of cross coupling in this context is based on the CSI information for the channels between a user device and a RRH, wherein the RRH is associated to another control node (second control node 300) than the control node (first control node 100) that the RRH that the user device is assigned to is associated to. The cross coupling is then the sum of CSI over all the user devices assigned to an AD and all the RRHs in other ADs and vice versa. An example of the cross coupling is shown in FIG. 8, where two RRHs (410n and 420n) are associated to different ANs (100 and 300) and two user devices (500n) is assigned to each RRH, represented with the solid arrows. The cross coupling between the two ADs is represented with the dashed arrows between the RRHs and user devices (500n).

ADF computation can be executed either centrally organized or de-centrally organized. In the central case one designated AN triggers all assigned ANs regarding their status information through the primitive. The assigned ANs then provide the status information which is the basis for performing the computation of the new ADF. In a further variant, this computation of the new ADF could also be triggered by one (or multiple) of the assigned ANs requesting a re-computation of the ADF, for example due to high utilization of backhaul capacity or computational power. In this case, the designated AN could request further status information from the remaining assigned ANs and then execute the computation of the new AD.

In contrast, in a decentralized organization, a set of ANs exchange first status information mutually, such that all ANs in the set have the entire CSI. Then, a distributed computation of the new ADF can be performed, where each AN computes an incremental update on the new ADF based on its local objective function only. Once the local computation is performed, the partial solution is passed to the next AN in a predefined order. This sequential computation can be terminated once a predefined quality level is not increased anymore or the percentage increase is lower than a given threshold, for example. All information exchange between the ANs is performed through the AN-AN backhaul. The formation of the set of ANs which are involved in the ADF process, as well as the selection of the centralized or decentralized ADF computation method, as well as the selection of the designated node in the centralized case, as well as the selection of the iteration sequence in the decentralized method are all governed by corresponding primitives of the control plane. Potentially, multiple such ADF processes could be running in parallel in different modes (centralized/decentralized), for example relating the resulting ADFs to different time slots in a bigger time reference structure. Finally, note that the computation of the ADF could also include the redistribution of user terminals. In this case, one possible implementation could involve first a computation of an ADF based on a fixed assignment of user terminals to RRHs. However, in the next step of the overall ADF computation process, the user terminal association to the RRHs is reconsidered/recomputed. Once this is complete, the ADF computation is invoked again to consider the RRHs assignment to ANs based on a given (previously computed) user terminal assignment.

Example in the Context of Interference Leakage Minimization

The ADF problem can be defined as: Given an AoI with N(>A) RRHs and A ANs, which RRHs should be assigned to which AN at a given time such that some performance objective (i.e., sum interference leakage minimization) is achieved? We eliminate the sum interference within AoI in a hierarchical manner. That is, we first formulate ADF as an IP problem and solve it using an iterative algorithm called Block Coordinate Descent (BCD) (this minimizes the interference across the ADs). Then, after ADF is solved using iterative BCD, users within every AD are jointly served by all the RRHs using a Weighted Minimum Mean Square Error (WMMSE) based Coordinated Beamforming (CB) algorithm (this minimizes the interference within each AD).

In case of the interference leakage setting, a decentralized method can then be implemented in the following way with reference to FIG. 7. For a previously defined set of ANs and a predefined iteration sequence, after exchanging status information each AN locally/partially solves the interference leakage minimization problem. More precisely, during each iteration, each AN first obtains the latest (binary-valued) association vectors x(t) from all other ANs illustrated with the arrow x(t) from AN1 to AN2 in FIG. 7. Based in latest (binary-valued) association vectors x(t) the AN updates its own association vector.

Figure 7:
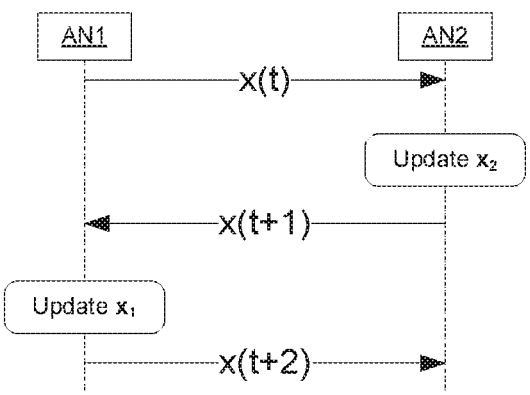
FIG. 7 illustrates the computation of a new antenna formation by means of signalling between ANs (CNs) on the backhaul.

The AN then sends out its updated association vector (x(t+1)) to all other ANs illustrated with the arrow x(t+1) from AN 2 to AN1 in FIG. 7.

This message exchange between the ANs is carried out over AN-AN backhaul, and the signalling continues, potentially until there is no further decrease in interference leakage or until a certain quality indicator is not improved by a target percentage anymore. The information exchange between the control nodes, x(t), is the resulting binary association matrix (# RRH x # AN), which is the outcome of the optimization process performed in the transmitting control node (AN1). Then the receiving control node (AN2) makes the optimization based on at least the received x(t) and the CSI information it has. AN2 further sends the outcome of the optimization process performed in AN2, x(t+1), to AN1, which repeats the process until the resulting x(t+n+1) is equal to the received x(t+n). That would be reaching the stable state.

C) Implementation of New Formation

In this mechanism, the new set of associations are conveyed to all nodes in the network and the corresponding re-associations are invoked (including transfer of backlogged data to different ANs). Re-associations might also be implemented iteratively to minimize the impact on the backhaul.

In a centrally organized set of ANs to perform the ADF, the designated ANs—once the ADF is finally generated—executes primitives on the control plane to reconfigure the ANs. For this, the designated node informs each AN about the new RRH assignments, such that upon the receipt of this information the ANs can hand over the RRHs to their newly assigned ANs. This includes also the transfer of backlogged data, as well as the rerouting of ongoing data transmissions to the new AN through the control plane. In case that the ADF is solved through RRH assignment and user terminal assignment, the designated node hands out both of these information sets to the ANs, and lets them then perform hand over of RRHs and user terminals. Note that in particular the handover of an entire RRH to a new AN is a novel feature for which signalling structures, i.e. primitives, in the control plane must be defined. In the decentralized organization of the computation, once the computation is terminated, i.e. the iteration process is halted due to too little increments in the quality improvement, one possibility is that the corresponding AN that discovers this termination criterium indicates this to all other ANs of the selected set, which then consider the resulting RRH/terminal assignment as valid assignment and implement it afterwards.

Example in the Context of Interference Leakage Minimization

After the new formation of ADs is available, signalling primitive on the control channel/backhaul is executed to inform the RRHs of their new associations (to potentially different ANs), for the fixed user association case. In addition, for the dynamic user association case, signalling on the control channel/downlink of air-interface is executed to let user terminals know of their new associations (to potentially different RRHs). Last but not the least, future data as well as currently backlogged data for each user is re-routed towards potentially different ANs.

Moreover, the system transitions from ADF state to this state to further improve the system-level throughput by updating the users-to-RRH association within the whole AoI. In this state, again a measurement (retrieval of status information) phase is conducted where the performance impact from various user-to-RRH associations is determined by the ANs within the AoI (independently, or, jointly). With the improved user-to-RRH association, RRH-to-AN associations are updated next. This iterative procedure is continued until there is no further improvement in system performance metric.

Furthermore, any methods according to embodiments of the disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the control node 100 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present control node 100 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

What is claimed is:

1. A first control node for a wireless communication system, the first control node comprising:
   a processor; and
   a non-transitory computer readable medium storing computer executable instructions, that when executed by the processor cause the following steps to be executed:
      receiving a first set of Channel State Information (CSI) comprising radio channels between a plurality of first remote radio heads and a plurality of user devices;
      determining a first association based on the first set of CSI, wherein the first association comprises an association between the plurality of first remote radio heads and the first control node;
      receiving a second set of CSI from a second control node, wherein the second set of CSI comprises CSI for radio channels between a plurality of second remote radio heads and the plurality of user devices; and
      determining the first association based on a concatenation of the first set of CSI and the second set of CSI.

2. The first control node according to claim 1, wherein determining the first association further includes instructions comprising:
   computing at least one cross coupling between the plurality of first remote radio heads and the plurality of user devices based on the first set of CSI; and
   determining the first association based on the computed cross coupling.

3. The first control node according to claim 2, wherein determining the first association further includes instructions comprising:
   computing a first cross coupling between the plurality of first remote radio heads and the plurality of user devices for a first candidate association;
   computing at least one second cross coupling between the plurality of first remote radio heads and the plurality of user devices for a second candidate association,
   determining the first association by selecting the first candidate association or the second candidate association having the lowest cross coupling.

4. The first control node according to claim 3, wherein determining the first association further includes instructions for iteratively performing the following steps:
   computing the first cross coupling;
   computing the second cross coupling; and
   determining the first association.

5. The first control node according to claim 1, further including instructions comprising:
   transmitting the first association to the second control node.

6. The first control node according to claim 1, further including instructions comprising:
   transmitting the first set of CSI to the second control node.

7. The first control node according to claim 1, further including instructions comprising:
   determining a first trigger comprising an instruction for the second control node to determine a second association between the plurality of second remote radio heads and the second control node; and
   transmitting the first trigger to the second control node.

8. The first control node according to claim 1, further including instructions comprising:
   receiving a second trigger from the second control node, the second trigger comprising an instruction for the first control node to determine the first association; and
   determining the first association in response to the reception of the second trigger.

9. The first control node according to claim 1, further including instructions comprising:
   transmitting the first association to the plurality of first remote radio heads.

10. The first control node according to claim 1, wherein the association between the plurality of first remote radio heads and the first control node comprises assignment of the plurality of first remote radio heads to the first control node.

11. A method for a wireless communication system the method comprising:
    receiving a first set of Channel State Information (CSI) comprising radio channels between a plurality of first remote radio heads and a plurality of user devices;
    determining a first association based on the first set of CSI, wherein the first association comprises an association between the plurality of first remote radio heads and a first control node;
    receiving a second set of CSI from a second control node, wherein the second set of CSI comprises CSI for radio channels between a plurality of second remote radio heads and the plurality of user devices; and
    determining the first association based on a concatenation of the first set of CSI and the second set of CSI.

12. The method according to claim 11, further comprising:
    transmitting the first association to the second control node.

13. The method according to claim 11, further comprising:
    transmitting the first set of CSI to the second control node.

14. The method according to claim 11, further comprising:
    determining a first trigger comprising an instruction for the second control node to determine a second association between the plurality of second remote radio heads and the second control node; and
    transmitting the first trigger to the second control node.

15. The method according to claim 11, further comprising:
    receiving a second trigger from the second control node, the second trigger comprising an instruction for the first control node to determine the first association; and
    determining the first association in response to the reception of the second trigger.

16. A non-transitory computer readable medium storing a program code, the program code comprising instructions for performing a method comprising:

receiving a first set of Channel State Information (CSI) comprising radio channels between a plurality of first remote radio heads and a plurality of user devices;

determining a first association based on the first set of CSI, wherein the first association comprises an association between the plurality of first remote radio heads and a first control node;

receiving a second set of CSI from a second control node, wherein the second set of CSI comprises CSI for radio channels between a plurality of second remote radio heads and the plurality of user devices; and determining the first association based on a concatenation of the first set of CSI and the second set of CSI.

17. The non-transitory computer readable medium according to claim 16, further comprising instructions for:
transmitting the first association to the second control node.

18. The non-transitory computer readable medium according to claim 16, further comprising instructions for:
transmitting the first set of CSI to the second control node.

19. The non-transitory computer readable medium according to claim 16, further comprising instructions for:
determining a first trigger comprising an instruction for the second control node to determine a second association between the plurality of second remote radio heads and the second control node; and
transmitting the first trigger to the second control node.

* * * * *